United States Patent
Inagaki et al.

[11] Patent Number: 5,223,211
[45] Date of Patent: Jun. 29, 1993

[54] ZIRCONIUM BASED ALLOY PLATE OF LOW IRRADIATION GROWTH, METHOD OF MANUFACTURING THE SAME, AND USE OF THE SAME

[75] Inventors: Masahisa Inagaki, Hitachi; Masayoshi Kanno, Kitaibaraki; Iwao Takase, Ibaraki; Toshitaka Kida, Hitachi; Noriyuki Ohnaka, Katsuta, all of Japan

[73] Assignee: Hitachi, Ltd., Tokyo, Japan

[21] Appl. No.: 799,151

[22] Filed: Nov. 27, 1991

[30] Foreign Application Priority Data

Nov. 28, 1990 [JP] Japan .................................. 2-322848

[51] Int. Cl.⁵ .............................................. G21C 3/34
[52] U.S. Cl. ....................................... 376/462; 376/438; 376/445
[58] Field of Search ............... 376/462, 438, 441, 442, 376/445; 29/18.1, 723; 148/11.5 F, 11.5 R; 420/425

[56] References Cited

U.S. PATENT DOCUMENTS

| | | | |
|---|---|---|---|
| 4,000,013 | 12/1976 | MacEwen et al. | 148/11.5 F |
| 4,172,742 | 10/1979 | Rowcliffe et al. | 148/38 |
| 4,452,648 | 6/1984 | Cheadle et al. | 148/11.5 F |
| 4,678,632 | 7/1987 | Ferrari | 376/462 |
| 4,990,305 | 2/1991 | Foster et al. | 376/457 |

FOREIGN PATENT DOCUMENTS

| | | |
|---|---|---|
| 0154559 | 3/1985 | European Pat. Off. |
| 59-50144 | 9/1982 | Japan. |
| 59-229475 | 6/1983 | United Kingdom. |

OTHER PUBLICATIONS

Japanese Patent Examined Publication No. 60-44387 (U.S. Pat. No. 4,238,251).

Primary Examiner—Donald P. Walsh
Assistant Examiner—Meena Chelliah
Attorney, Agent, or Firm—Antonelli, Terry, Stout & Kraus

[57] ABSTRACT

A zirconium based alloy plate of low irradiation growth, containing not more than 5 wt % Sn and/or not more 5 wt % Nb, and the balance Zr of not less than 90 wt %. The alloy plate has a texture that <0001> orientation (Fr value) with respect to direction perpendicular to the surface of the plate ranges from 0.20 to 0.50. This alloy plate is effective in being used to form a fuel channel box. Also a fuel assembly using this channel box is provided in which the crystal orientation of the zirconium alloy is made random by a heat treatment. Specifically, by the heat treatment, the Fr, Ft, and Fl values thereof are set to 0.25 to 0.50, 0.25 to 0.36, and 0.25 to 0.36, respectively.

30 Claims, 9 Drawing Sheets

ZIRCONIUM BASED ALLOY PLATE OF LOW IRRADIATION GROWTH, METHOD OF MANUFACTURING THE SAME, AND USE OF THE SAME

BACKGROUND OF THE INVENTION

This invention relates to a novel zirconium based alloy plate, a method of manufacturing this alloy plate, a fuel channel and a fuel assembly using this alloy plate.

Zirconium is a material having high corrosion resistance and a small neutron absorption cross section and is therefore used for a reactor fuel assembly member. For this kind of use, Zr-Sn-Fe-Cr-Ni alloys called zircaloy-2 and zircaloy-4 are mainly used. If these alloys are used in a nuclear reactor for a long time, elongation, bending and deformation in particular directions occur as shown in FIG. 2, because (0001) planes thereof are oriented in the direction of plate thickness. If a bending deformation occurs in a fuel channel box, the space for driving the control rod is reduced. Such a phenomenon impedes the operation of the reactor. Also, if a bending deformation occurs, the distance to the fuel cladding tube is changed so that the ratio of water and uranium is locally changed, thereby causing a change in fission reactivity and, hence, abnormal heating. By this effect, corrosion of the fuel cladding tube is accelerated. Further, fuel damage may thereby be caused. To prevent bending deformation of the fuel channel box due to such non-uniformity of neutron exposure, uniformization of neutron exposure based on changing the fuel assembly loading position in the reactor core has been studied. This study, however, has not succeeded in preventing bending deformation. The reduction in the control rod driving space and the change in fission reactivity caused by bending deformation are major factors of limitation of the service life of the fuel channel box.

The corrosion of the fuel channel box also is a factor of limitation of the service life. Japanese Patent Examined Publication Nos. 56-12310 and 60-44387 disclose a method for improving the corrosion resistance by a heat treatment based on quenching a Zr alloy from an $\alpha+\beta$ phase temperature range or a $\beta$ phase temperature range. By this method, however, the bending deformation due to irradiation growth cannot be reduced for the reason described later, and this method provides no effective technique for limiting irradiation growth of zirconium alloy members.

This conventional method uses a heat treatment for improving only the corrosion resistance of zirconium alloy members without changing the grain size, orientation and mechanical characteristics thereof. For this heat treatment, therefore, heating to an $\alpha+\beta$ phase temperature range (800 to 980° C.) rather than a $\beta$ phase temperature range ($\geqq 980°$ C.) in which coarsening of crystal grains occurs, followed by quenching, is effected. The crystal orientation, which is an important factor of limitation of irradiation growth, is not changed by this heat treatment and therefore no effective irradiation growth limiting technique is provided. Japanese Patent Unexamined Publication No.59-229475 discloses a method of orienting crystals so that an fl value is 0.15 to 0.5. This method also provides no irradiation growth limiting technique or rather promotes irradiation growth.

SUMMARY OF THE INVENTION

An object of the present invention is to provide a zirconium alloy member free from the above-mentioned elongation and bending deformation due to irradiation growth. Specifically, a main object of the present invention is to provide a long-life zirconium based alloy tubular member and a channel box in which the irradiation growth does not occur.

According to the present invention, these objects can be achieved by making <0001> orientation of a hexagonal crystal of a zirconium alloy plate substantially perfectly random as shown in FIG. 1.

According to one aspect of the present invention, there is provided a zirconium based alloy plate of low irradiation growth, containing not more than 5 wt % Sn and/or not more than 5 wt % Nb, and the balance Zr of not less than 90 wt %, the alloy plate having <0001> orientation of hexagonal crystal which orientation (Fr value) ranges from 0.20 to 0.5 with respect to direction perpendicular to the surface of the plate.

According to another aspect of the present invention, there is provided a square tubular member made of a zirconium based alloy plate of low irradiation growth, containing not more than 5 wt % Sn and/or not more than 5 wt % Nb, and the balance Zr of not less than 90 wt %, the alloy member having <0001> orientation of hexagonal crystal in which <0001> orientation (Fr value) with respect to direction perpendicular to the surface of the tubular member ranges 0.20 to 0.50, another orientation (Ft value) with respect to longitudinal direction of the cylindrical member ranges 0.25 to 0.36, and still another orientation (Fl value) with respect to circumferential direction of the tubular member ranges 0.25 to 0.36.

According to still another aspect of the present invention, there is provided a zirconium based alloy plate of low irradiation growth, containing not more than 5 wt % Sn and/or not more 5 wt % Nb, and the balance Zr of not less than 90 wt %, the alloy having $\alpha$ phase, and the grain size of the alloy being in the range of 50 to 500 $\mu$m.

According to a further aspect of the present invention, there is provided a zirconium based alloy member of low irradiation growth, containing not more than 5 wt % Sn and/or not more than 5 wt % Nb, and the balance Zr of not less than 90 wt %, the alloy having $\alpha$ phase, the alloy plate having <0001> orientation of hexagonal crystal in which <0001> orientation is substantially random, and strain occurring due to fast neutron irradiation of $2\times10^{22}$ (n/cm$^3$) being not more than $3\times10^{-4}$.

According to still a further aspect of the present invention, there is provided a method of producing a zirconium based alloy plate of low irradiation growth which contains not more than 5 wt % Sn and/or not more than 5 wt % Nb and the balance Zr of not less than 90 wt %, in which the alloy is heated in a $\beta$ single phase temperature range and is cooled, the method comprising the steps of retaining the alloy in the $\beta$ single phase temperature range in a short period of time so that <0001> orientation (Fr value) with respect to direction perpendicular to the surface of the alloy member is 0.20 to 0.40.

The method of producing a zirconium based alloy plate of low irradiation growth in accordance with the present invention is characterized by comprising the step of retaining in a short period of time the alloy member in the β single phase temperature range so that value of parameter P defined by P=(3.55+log t)×log(T−980) where t is a retention period of time and T(h) is a retaining temperature (° C.) is not less than 0.8, and quenching the alloy.

According to still a further aspect of the present invention, there is provided a method of producing a square tubular member made of a low irradiation growth zirconium based alloy containing not more than 5 wt % Sn and/or not more than 5 wt % Nb and the balance Zr of not less than 90 wt %, comprising the steps of: locally induction-heating and keeping the tubular member in a β single phase temperature range; and forcibly cooling the heated portion of the tubular member by cooling medium, the improvement comprising the steps of retaining the tubular member portion in a short period of time in the β single phase temperature range so that <0001> orientation (Fr value) with respect to direction perpendicular to the surface of the square tubular member is 0.20 to 0.40; and then quenching the heated portion.

According to a further aspect of the present invention, there is provided a method of producing a square tubular member made of a zirconium based alloy, comprising the steps of continuously induction-heating a portion of the tubular member locally while moving it relatively, and forcibly cooling the heated portion by a cooling medium, the improvement comprising the steps of inserting in the tubular member a mandrel made of a metal material having a thermal expansion coefficient larger than that of the alloy, and heating the tubular member from the outer surface of the tubular member while fixing at least both ends of the tubular member by the mandrels.

According to a further aspect of the present invention, there is provided a fuel channel box formed of a square tubular member formed by welding two channel-shaped members made of zirconium based alloy, the alloy having <0001> orientation (Fr value ) with respect to direction perpendicular to the surface of the square tubular member of 0.20 to 0.50, the whole surface of the channel box being provided with an oxide layer formed by an autoclave treatment.

According to a further aspect of the present invention, there is provided a fuel assembly comprising a fuel rod provided within a fuel cladding tube with fuel pellets, a channel box receiving a plurality of pieces of the fuel rods, a spacer for partitioning the fuel rods received in the channel box, and upper and lower tie plates disposed respectively at the upper and lower portions of the channel box, the channel box being made of a zirconium based alloy containing not more than 5 wt % Sn and/or not more than 5 wt % Nb and the balance Zr, the alloy having a texture that <0001> orientation (Fr value) with respect to direction perpendicular to the surface of the plate ranges from 0.20 to 0.50.

According to a further aspect of the present invention, there is provided a method of using a nuclear fuel channel box made of a zirconium based alloy in which channel box a plurality of nuclear fuel rods are disposed, the alloy having a texture that <0001> orientation (Fr value) with respect to direction perpendicular to the surface of the tubular member ranges from 0.20 to 0.50, the nuclear fuel being exchanged during the use of the channel box at least two times.

According to still a further aspect of the present invention, there is provided a method of using a fuel channel box formed of a tubular member formed by welding two channel-shaped members made of a zirconium based alloy, the alloy having a texture that <0001> orientation (Fr value) with respect to direction perpendicular to the surface of the tubular member ranges from 0.20 to 0.50, the whole surface of the channel box being provided with an oxide film formed by an autoclave treatment, the channel box being used so that the degree of burn-up on taking-out is not less than 32 Gwd/t or so that nuclear fuel is exchanged at least two times during the use thereof.

According to still a further aspect of the present invention, there is provided a method of using a fuel assembly having a fuel assembly having a fuel rod having fuel pellets disposed within a fuel cladding tube, a channel box receiving a plurality of pieces of the fuel rods, a spacer for partitioning the fuel rods received in the channel box, and upper and lower lattice plates disposed respectively at the upper and lower portions of the channel box, the channel box being made of a zirconium based alloy containing not more than 5 wt % Sn and/or not more than 5 wt % Nb and the balance Zr of not less than 90 wt %, the alloy having a texture that <0001> orientation (Fr value) with respect to direction perpendicular to the surface of a plate ranges from 0.20 to 0.50, the channel box being used so that the degree of burn-up on taking-out is not less than 32 GWd/t or so that nuclear fuel is exchanged at least two times during the use thereof.

According to a further aspect of the present invention, there is provided a method of using a nuclear fuel channel box made of a zirconium based alloy in which channel box a plurality of nuclear fuel rods are disposed, the alloy comprising hexagonal crystals having a texture that <0001> orientation (Fr value) with respect to direction perpendicular to the surface of the tubular member ranges from 0.20 to 0.50, the channel box being used so that the degree of burn-up on taking-out is not less than 32 GWd/t or so that it exposes neutron irradiation not less than $10^{22}$ n/cm$^2$ during the use thereof.

According to a further aspect of the present invention, there is provided a method of operating a nuclear reactor having within a reactor core a plurality of nuclear fuel channel boxes each formed of a tubular box made of a zirconium based alloy, comprising the steps of exchanging fuel after a predetermined period of operation time, and subsequently operating the reactor in a predetermined period of time, the alloy containing hexagonal crystals having a texture that <0001> orientation (Fr value) with respect to direction perpendicular to the surface of the tubular member ranges from 0.20 to 0.50, the channel boxes which are subjected to such operation as the degree of burn-up on taking-out is about 32 GWd/t or more being disposed in the same operation position as that of prior operation thereof, and fuel being exchanged at least two times during the use thereof.

It is not only to exchange the channel box at least two times but also to use the channel box under a less deformation thereof for such period of time as a degree of burn-up on taking out becomes 32 GWd/t or more or for such a period of time as neutron irradiation at an amount of neutron exposure becomes $10^{22}$ n/cm or more.

Specifically, the channel box can be effectively used at a high degree of burn-up of 38 GWd/t or higher, or 45 GWd/t or higher.

DESCRIPTION OF THE PREFERRED EMBODIMENT

Figure 1:
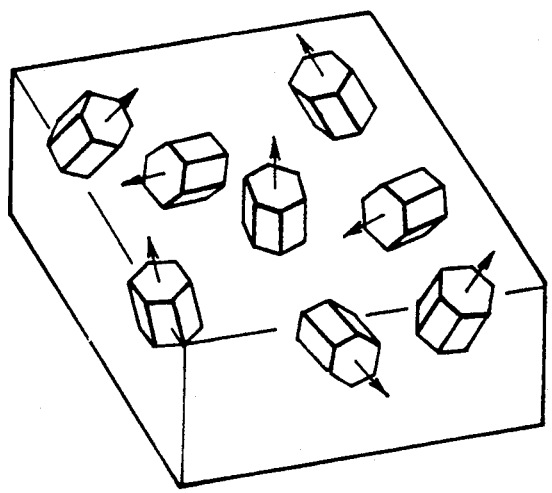
FIG. 1 is a schematic diagram of a crystal orientation of a plate in accordance with the present invention.
Figure 2:
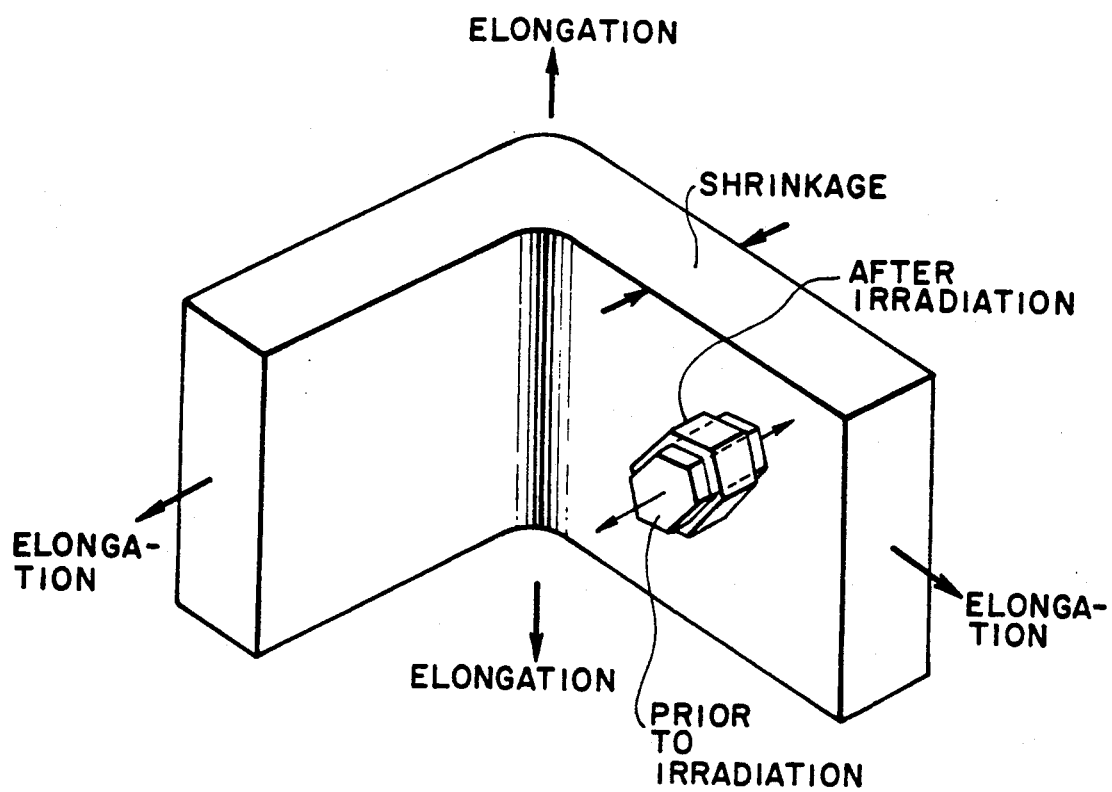
FIG. 2 is a schematic diagram of the mechanism of irradiation growth.

The above-mentioned deformation occurs because <0001> directions of a hexagonal Zr metal are oriented perpendicularly to zirconium alloy surfaces as shown in FIG. 2. When the hexagonal Zr metal is subjected to neutron irradiation, crystals contract in <0001> directions while expanding in directions perpendicular to <0001> directions. More strictly, an atomic plane (dislocation) perpendicular to (0001) plane is introduced by neutron irradiation to cause such contraction and expansion of crystals. Crystals are therefore irradiation-grown in longitudinal and widthwise directions in the case of a fuel channel box in which <0001> directions of crystals are oriented perpendicularly to its surfaces. The amount of neutron exposure is greater in a position closer to the center of the reactor core. Variations in the amount of neutron exposure cause variation in irradiation growth amount and, hence, bending deformation. Randomly orienting <0001> directions of crystals is effective in limiting the irradiation growth. The irradiation growth is a deformation without any change in volume. In the case of irradiation growth of crystal grains of a polycrystal, therefore, the polycrystal can be considered free of deformation as a whole, because, even if each of the crystal grains are deformed in a particular direction, all the directions of the deformation are random.

For quantitative evaluation of crystal orientation, a method is ordinarily used in which an X-ray diffraction intensity of a particular crystal plane is measured based on a combination of reflected/ transmitted X-ray diffraction methods and F value is calculated by equation (1) from the X-ray diffraction intensity measured.

$$F = \int_0^{\pi/2} V(\phi) \cdot \cos^2\phi \cdot d\phi \quad (1)$$

where $\phi$ is an angle between a particular direction (e.g., a direction perpendicular to the plate surface) and a particular crystal orientation (e.g., <0002> crystal orientation), and V($\phi$) is the volume proportion of crystals oriented in the direction $\phi$. If directions r, t and l are respectively defined as a normal to the plate (tube) surface (Fr), the longitudinal direction of the plate (tube) (Ft), and the widthwise direction of the plate (the circumferential direction of the tube) (Fl) which directions are perpendicular to each other, then a relationship expressed by an equation (2):

$$Fr + Ft + Fl = 1.0 \quad (2)$$

is established. If the crystal orientation is made completely random, $$Fr = Ft = Fl = \tfrac{1}{3} \quad (3)$$

The process is controlled so that each of Fr, Ft and Fl is 0.20 to 0.50. Preferably, Fr is 0.25 to 0.50, Ft is 0.25 to 0.36 and Fl is 0.25 to 0.36. Most preferably, each of Fr, Ft and Fl is 0.31 to 0.35.

Figure 3:
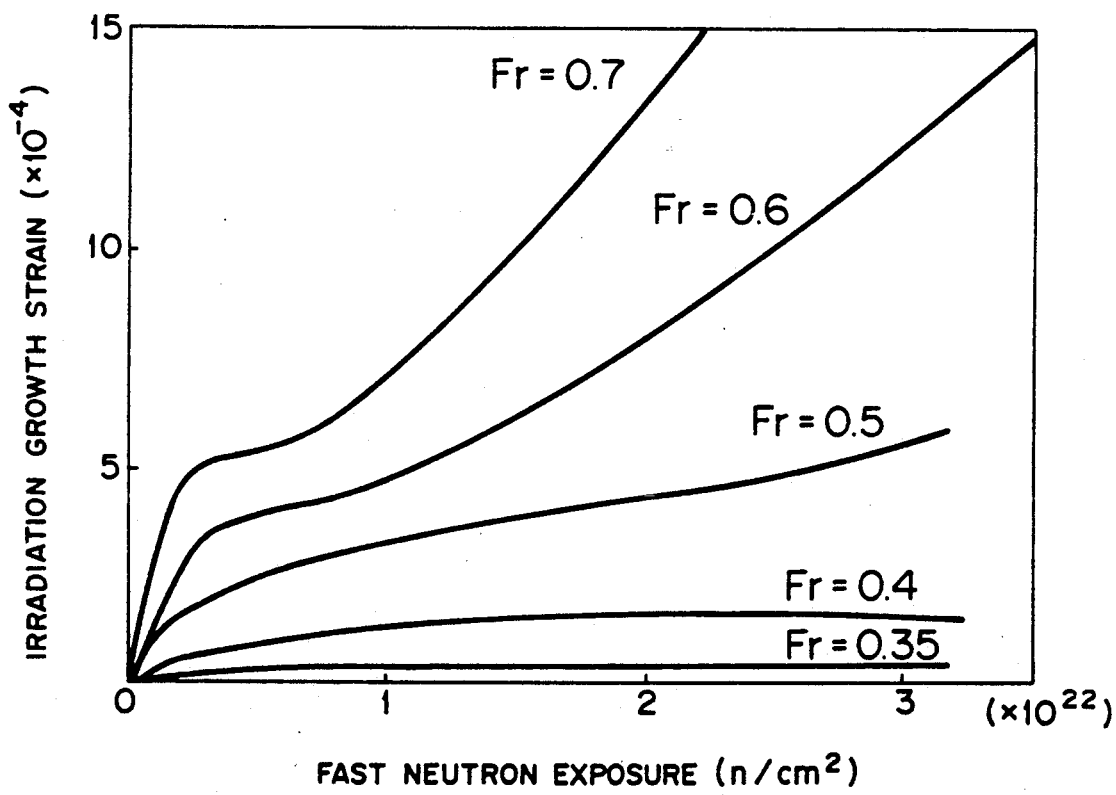
FIG. 3 is a diagram of the amount of high-speed neutron irradiation and Fr value both influencing irradiation growth strain.

The Fr value of (0002) crystal planes (equivalent to (0001) planes) of a plate and a tube manufactured by a process based on repeating ordinary cold working and annealing is about 0.6, and <0001> directions of crystals are mainly oriented in the direction of a normal to the plate (tube) surface. This structure in which crystals are mainly oriented in the surface normal direction is called texture. FIG. 3 shows a relationship between neutron exposure and irradiation elongation with the Fr value used as a parameter. When the Fr value is not more than 0.50, preferably not more than 0.45, the irradiation elongation is remarkably reduced. If the Fr value is set to 0.333 to 0.35, the elongation is limited to substantially 0 (zero) even in a high irradiation range in which the amount of neutron exposure $\geq 10^{22}$ (n/cm$^2$).

A process comprising the steps of heating a zirconium alloy member to a $\beta$ phase temperature range (a temperature higher than 980° C. in the case of a zircaloy), sufficiently growing $\beta$Zr crystal grains and thereafter quenching the material by water spraying at the time of cooling may be used as a means for obtaining a texture in which the Fr value $\leq 0.50$. By this process, hexagonal Zr crystals transform to cubic $\beta$Zr crystals and again transform to hexagonal Zr crystals by cooling. To obtain by this heat treatment a texture in which the Fr value is 0.333 to 0.35, it is necessary to grow $\beta$Zr crystal grains so that the grain size is at least 100 μm. For a texture in which Fr value $\leq 0.50$, $\beta$Zr crystal grains need to be grown to have a size of at least 50 μm, preferably at least 150 μm. The period of time for heating in the $\beta$ phase temperature range may be shorter if the heating temperature in the $\beta$ phase temperature range is higher (preferably 1,000 to 1,350° C., more preferably 1,000° to 1,200° C.). The period of time for retention at the maximum temperature may be very short. For example, it is 1.5 to 100 sec., preferably 5 to 60 sec. It is particularly preferable to effect heating in a range marked with in FIG. 8.

In the case of retaining at an $\alpha + \beta$ phase temperature, $\alpha$Zr crystals remain, so that a preferable texture cannot be obtained. In another case of heating up to the $\beta$ phase temperature range, a preferable texture cannot be obtained if the retention time is short while the heating temperature is comparatively low. This is because in each of transformation from $\alpha$Zr to $\beta$Zr (during heating) and transformation from $\beta$Zr to $\alpha$Zr (during cooling), the transformation proceeds while such crystal orientation relationship that (0001) crystal planes of $\alpha$Zr and (110) planes of $\beta$Zr are parallel is maintained, so that no change in the crystal orientation occurs when heating and cooling are completed. To obtain a texture in which crystal orientation is random, it is necessary to grow βZr crystal grains having various crystal orientations. For this growth, a temperature or retention time is required high or long (0.8 or greater in terms of value P) enough to grow βZr crystal grains until the grain size is increased to at least 50 μm.

As described above, the Fr value varies according to the heat treatment, and the temperature and the retention time are important factors. Accordingly, to reduce the Fr value to 0.50 or less by heating in the β phase temperature range, it is necessary to set the parameter P obtained by the equation shown above to 1.5 or greater (βZr crystal grain size of 60 μm or greater).

Preferably, the parameter P is 2.5 to 5 (a βZr crystal grain size of 70 to 500 μm). More preferably, it is 3.2 to 5 (a βZr crystal grain size of 100 to 500 μm).

A suitable zirconium based alloy contains 5% or less by weight of Sn and/or 5% or less by weight of Nb and the balance 90% or more by weight (preferably, 95 to 98.5% by weight) of Zr. Sn and Nb are needed to increase the strength of Zr. 3% or less of Sn and 5% or less of Nb are required. Preferably, the lower limit of the content of each of Sn and Nb is 0.1%. A zircaloy contains, preferably, 1 to 2%, more preferably 1.2 to 1.7% of Sn. This alloy may contain 0.5% or less of Fe and 0.5% or less of Cr, this content of Cr and 0.2% or less of Ni, or these contents of Fe and Ni. Specifically, it may contain 0.1 to 0.38% Fe, 0.05 to 0.15% Cr and 0.03 to 1.25% Ni, or 0.22 to 0.38% Fe, 0.05 to 0.15% Cr and 0.09 to 0.15% Ni. In the latter case, Fe or Ni may be used singly. The Fe/Ni ratio is preferably 1.3 to 10.

As examples of alloys containing Nb, there may be used Zr-0.5 to 2% Nb, Zr-2 to 5% Sn-0.5 to 1.5% Mo, Zr-0.5 to 0.15% Sn-0.5 to 1.5% Nb-0.1 to 1.0% Fe, Zr-0.5 to 5.0% Nb-0 to 3.0% Sn-2% or less of one or two or more of Fe, Ni, Cr, Ta, Pd, Mo and W.

In a manufacture process in accordance with the present invention, a plate is successively heated for a desired retention time with an induction coil while being moved at the time of heating in the β phase temperature range, and is forcibly cooled after the heating. By this heating to the β phase, a structure can be obtained in which <0001> directions are randomly oriented and which has high corrosion resistance to high temperature and high pressure pure water. Preferably, cooling is performed by spraying water so that the cooling speed is not lower than 50° C./sec., preferably, not lower than 150° C./sec. Other heating means, such as infrared rays and an electric furnace, may be used.

When heating in the β phase temperature range, it is preferable to restrain the heated member by fixing it with a member having a thermal expansion coefficient larger than that of the Zr based alloy. In particular, in the case of a tubular member, it is preferable to perform heating and cooling in such manners that a metallic member is inserted into the inner cavity of the tube while reducing the thermal influence thereon by preventing contact between the whole surfaces of these members, and that opposite ends of these members are fixed to each other to prevent deformation of the tubular member during heating. If such a restraining member is provided, heating and cooling can be performed easily. As a material of this restraining member, an austenitic stainless steel, such as SUS304, 316 or 347, is preferred.

Subsequently to the β phase heat treatment, annealing for uniformly heating the whole member is performed. Annealing is effected at 500 to 650° C. (preferably, 550° to 640° C.). For this heating as well, it is preferable to use the above restraining member to restrain the heated member, whereby the tubular member can be suitably shaped. This heat treatment is effect in a non-oxidizing atmosphere. It is particularly preferable to effect the treatment in Ar.

By a final heat treatment, an oxide layer on the surface is removed by sand blasting and acid cleaning. After removing the oxide layer, the surface is oxidized by an autoclave to form a stable oxide layer thereon, thereby finishing the product. End portions which are fixed provided with screw holes and etc. for the above-mentioned fixing purpose are cut off and the material of these portions are reused.

A channel box in accordance with the present invention is formed by abutting two generally U-shaped members on each other, plasma-welding the abutting portions to form a rectangular tube and making the welded portion flat, and is thereafter used. For the heat treatment of this rectangular tube, it is preferable to insert an X-shaped restraining member therein. The heat treatment according to the present invention may be applied to any one of the states of a plate state, a U-shaped state and a rectangular tube obtained after welding. Plate members heat-treated are used by being bent to be U-shaped (channel-shaped) and by being welded into a rectangular tube to be used.

EMBODIMENT 1

Three zircaloys having alloy compositions shown in Table 1 were used. They were heat-treated under conditions shown in Table 2.

TABLE 1

| Alloy Name | Alloy Elements (wt %) | | | | | | |
|---|---|---|---|---|---|---|---|
| | Sn | Nb | Fe | Cr | Ni | Mo | O | Zr |
| Zircaloy-4 | 1.50 | — | 0.21 | 0.10 | — | — | 0.12 | bal. |
| Zircaloy-2 | 1.50 | — | 0.15 | 0.10 | 0.10 | — | 0.12 | bal. |
| Zircaloy-C | 1.50 | — | 0.25 | 0.10 | 0.10 | — | 0.12 | bal. |

TABLE 2

| Heat treatment No. | Maximum heating temperature (°C.) | Retention time at maximum heating temp. (sec) | Cooling rate (°C./sec) | P |
|---|---|---|---|---|
| 1 | as-supplied state | | | — |
| 2 | 900 (α + β) | 600 | 200 | — |
| 3 | 1000 (β) | 60 | 200 | 2.31 |
| 4 | 1000 (β) | 600 | 200 | 3.61 |
| 5 | 1200 (β) | 60 | 150 | 4.16 |
| 6 | 1000 (β) | 5 | 200 | 0.91 |

Each of the alloys was provided as a plate having been formed to have a thickness of 2 mm by the repetition of cold rolling and annealing at 650° C. for two hours before being used in heat treatment tests shown above. Heat treatments 2 to 4 shown in Table 2 were effected in such a manner that test pieces having a width of 400 mm and a length of 40 mm were cut from the materials, heated in an electric furnace and cooled in water. The parameter P was calculated by the above-mentioned equations.

Table 3 shows the results of F value measurement with respect to (0002) plane (parallel to (0001) plane) and (1010) plane (vertical to (0001) plane) of heat-treated members 1 to 6. The F value measurement was performed by a method based on the combination of reflected/transmitted X- ray diffraction methods mentioned above. In the case of a tubular member, Fr is a rate of orientation in a direction perpendicular to the surface thereof, Ft is a rate of orientation in the longitudinal direction thereof, and Fl is a rate of orientation in the circumferential direction thereof.

TABLE 3

| Heat treatment No. | (0002) Plane | | | (1010) Plane | | |
|---|---|---|---|---|---|---|
| | Fr | Fl | Ft | Fr | Fl | Ft |
| 1 | 0.672 | 0.108 | 0.220 | 0.158 | 0.448 | 0.393 |
| 2 | 0.666 | 0.124 | 0.210 | 0.156 | 0.445 | 0.398 |
| 3 | 0.414 | 0.295 | 0.292 | 0.301 | 0.354 | 0.345 |
| 4 | 0.335 | 0.352 | 0.318 | 0.325 | 0.329 | 0.344 |
| 5 | 0.336 | 0.334 | 0.330 | 0.330 | 0.335 | 0.335 |
| 6 | 0.470 | 0.203 | 0.327 | 0.209 | 0.401 | 0.390 |

In the case of the plate (heat treatment No. 1) manufactured by repeating both cold rolling and annealing, the Fr value of (0002) planes is large, about 0.7 while the Fr value of (1010) planes is small (about 0.15) in comparison with Fl and Ft. From these results shown in Table 3, it can be understood that (0002) planes are oriented generally parallel to the plate surface. The F value of the member (heat treatment No. 2) heated to the $\alpha+\beta$ phase temperature range and cooled is generally equal to that of the as-supplied member (heat treatment 1). It is thereby understood that the texture is not changed by heating to and cooling from the $\alpha+\beta$ phase temperature range. In the cases of heating in the $\beta$ phase temperature range (1,000° C.) for 1 minute and 5 seconds followed by cooling (heat treatment Nos. 3 and 6), a reduction in the Fr value and increases in the Fl and Ft values of (0002) planes, and an increase in the Fr value and reductions in the Fl and Ft values of (1010) planes are recognized in comparison with the as-supplied member, and the crystal orientation is made random. However, it does not satisfy Fr value $\leq 0.35$, which is a target value enabling use in such high irradiation range as the amount of neutron exposure $\geq 10^{22}$ (n/cm$^2$). In the cases of retention at 1,000° C. for 10 minutes (heat treatment No. 4) and increasing the heating temperature to 1,200° C. (heat treatment No. 5), each of the F values of (0002) planes and (1010) planes is about 0.33, and it is understood that the crystal orientation is made substantially completely random. As described above, neither bending deformation nor elongation deformation is caused in the members processed by heat treatments 4 and 5, even if the internal neutron exposure is non-uniform.

FIG. 3 is a diagram showing a relationship between high-speed neutron exposure and irradiation growth strain. As shown in FIG. 3, the strain is abruptly increased as the amount of neutron exposure is increased, if the Fr value is greater than 0.4, but the strain is saturated and is not increased under irradiation, if the Fr value is not greater than 0.4. Specifically, in the case of Fr=0.35, <0001> crystal orientation is substantially random, so that strains in the direction of the normal, the longitudinal direction and the direction of the plate thickness are cancelled out between crystals, that is, the strain is substantially naught, not greater than $0.5 \times 10^{-4}$. In the case of Fr=0.4, the strain is small when the amount of neutron exposure is not greater than $3 \times 10^{22}$ n/cm$^2$, but is gradually increased as the amount of neutron exposure is increased from this level.

In contrast, when Fr=0.35, the strain is not increased even if the amount of neutron exposure is increased.

Figure 4:
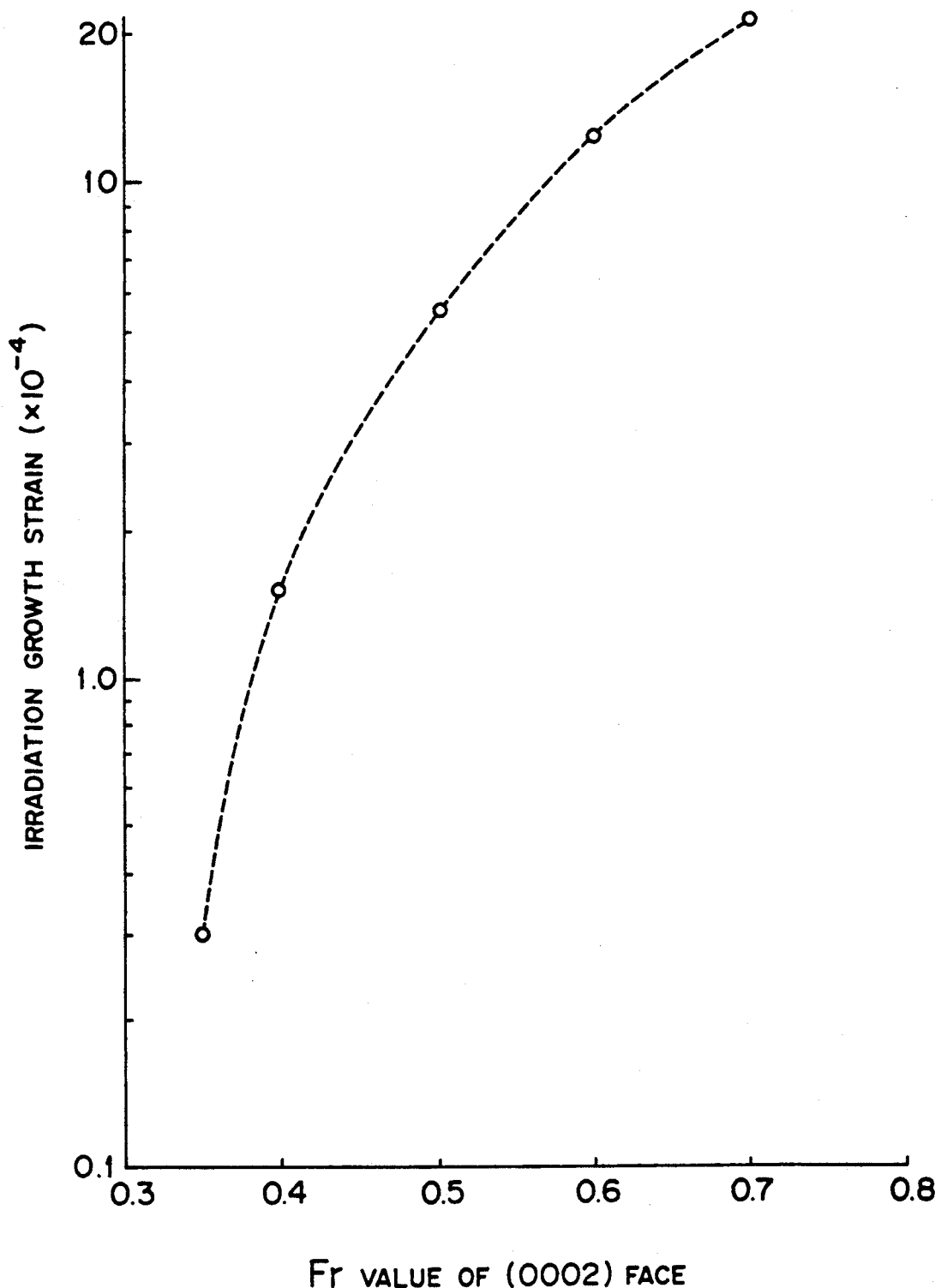
FIG. 4 is a diagram of a relationship between the irradiation growth strain and the Fr value.

FIG. 4 is a diagram showing the relationship between the Fr value and the irradiation growth strain caused by high-speed neutron irradiation at $3 \times 10^{22}$ n/cm$^2$. With the increase in the Fr value, the amount of strain is increased abruptly. The strain caused by irradiation growth when Fr=0.35 is about $0.2 \times 10^{-4}$. This value is particularly small, that is, about 1/7 of the strain occurring when Fr=0.4, which causes strain of about $1.5 \times 10^{-4}$. The strain caused in the Fr=0.4 case is much smaller than the strain occurring when Fr =0.5, that is, ⅓ of the same. However, the strain occurring when Fr=0.6 is about a half of that when Fr =0.7. The strain limiting effect becomes comparatively small when Fr exceeds 0.4.

Roundish crystal grains observed in the metallic structure of each of the heat-treated member Nos. 1, 3, and 4 are $\beta$Zr grains. No $\beta$Zr crystal grains were observed. Polygonal crystal grains are $\beta$Zr crystal grains formed during heating in the $\beta$ phase temperature range. It is understood that as the 1,000° C. retention time is increased from 1 to 10 minutes, $\beta$Zr crystal grains grow largely. A layered or acicular structure observed in $\beta$Zr crystal grains is formed when $\beta$Zr transforms into $\alpha$Zr again during cooling, and is not a $\beta$Zr grain boundary.

Figure 5:
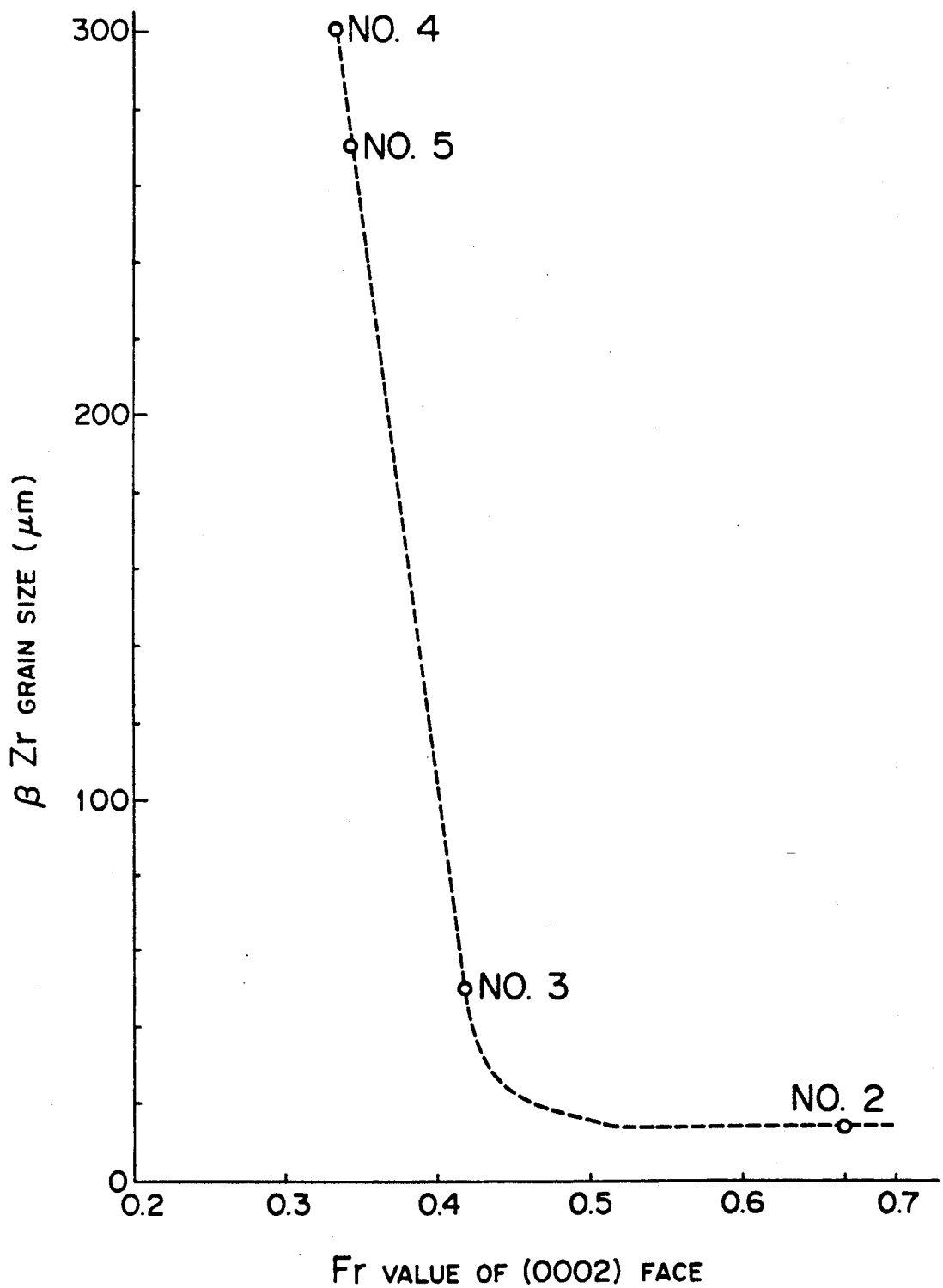
FIG. 5 is a diagram of a relationship between the Fr value and the $\beta$Zr crystal grain size.

FIG. 5 shows the relationship between the $\beta$Zr crystal grain size and the Fr value of (0002) planes. It is understood that a texture having an Fr value 0.35 or smaller is formed by such growth of $\beta$Zr crystal grains as having a grain size of 200 μm or greater.

It is possible to make the crystal orientation of (0002) planes random by the growing of crystal grains. The degree of randomness of this orientation is about 75% when value is 0.40. The grain size at this time is about 100 μm. When the grain size exceeds 150 μm, the degree of randomness is about 80% or higher. At this time the Fr value is 0.385. When the Fr value is 0.35, the degree of randomness is about 90% or higher. At this time the grain size is about 250 μm or greater.

Figure 6:
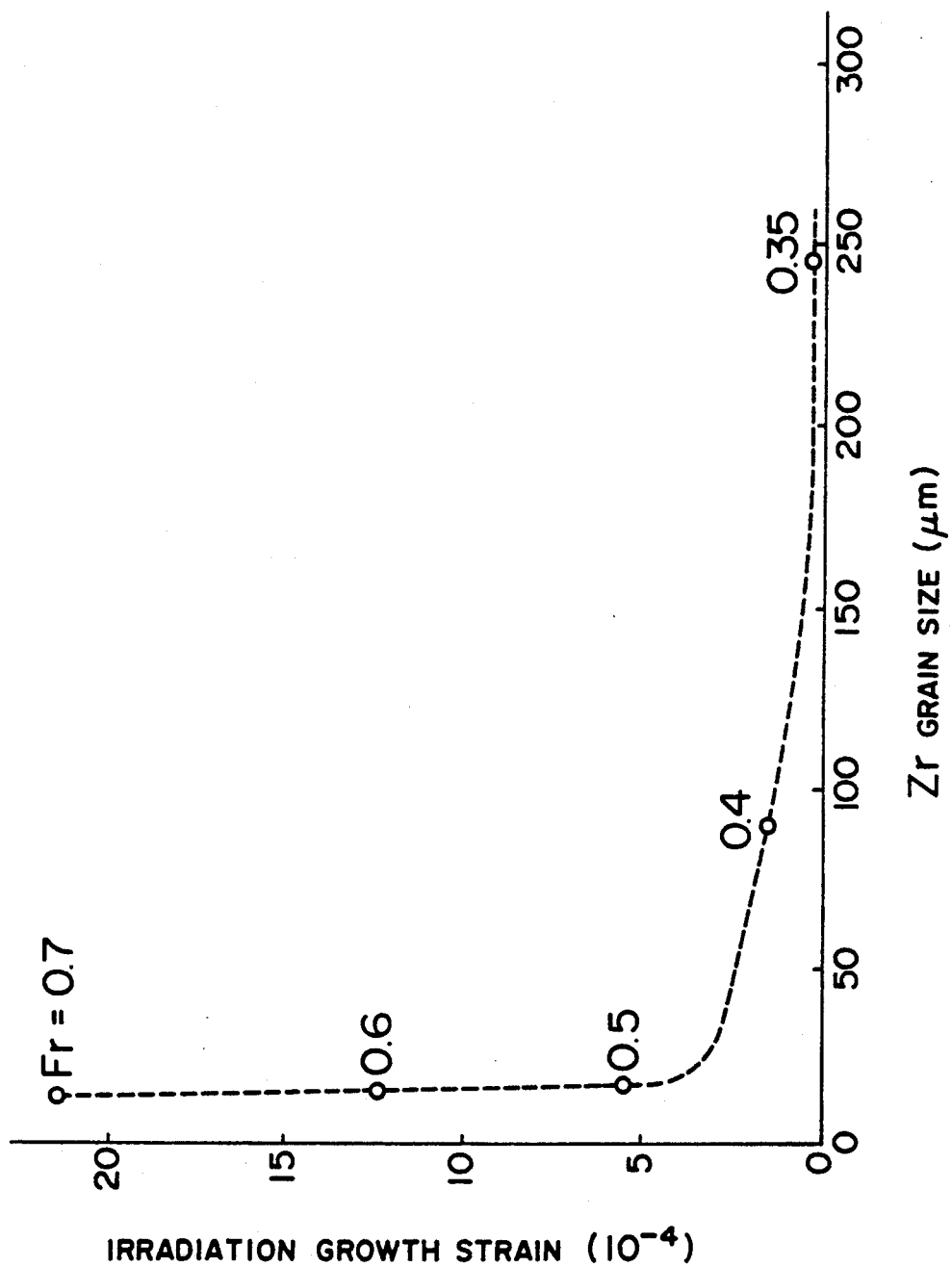
FIG. 6 is a diagram of a relationship between the irradiation growth strain and the Zr crystal grain size.

FIG. 6 is a diagram showing the relationship between the $\beta$Zr crystal grain size and the irradiation growth strain. The strain occurring when the grain size is 90 μm or greater is remarkably small, about $1.5 \times 10^{-4}$. The strain becomes very small, $0.5 \times 10^{-4}$ or less when the grain size is 150 μm or greater. It is particularly small, about $0.3 \times 10^{-4}$ when the grain size is 200 μm or greater.

Figure 7:
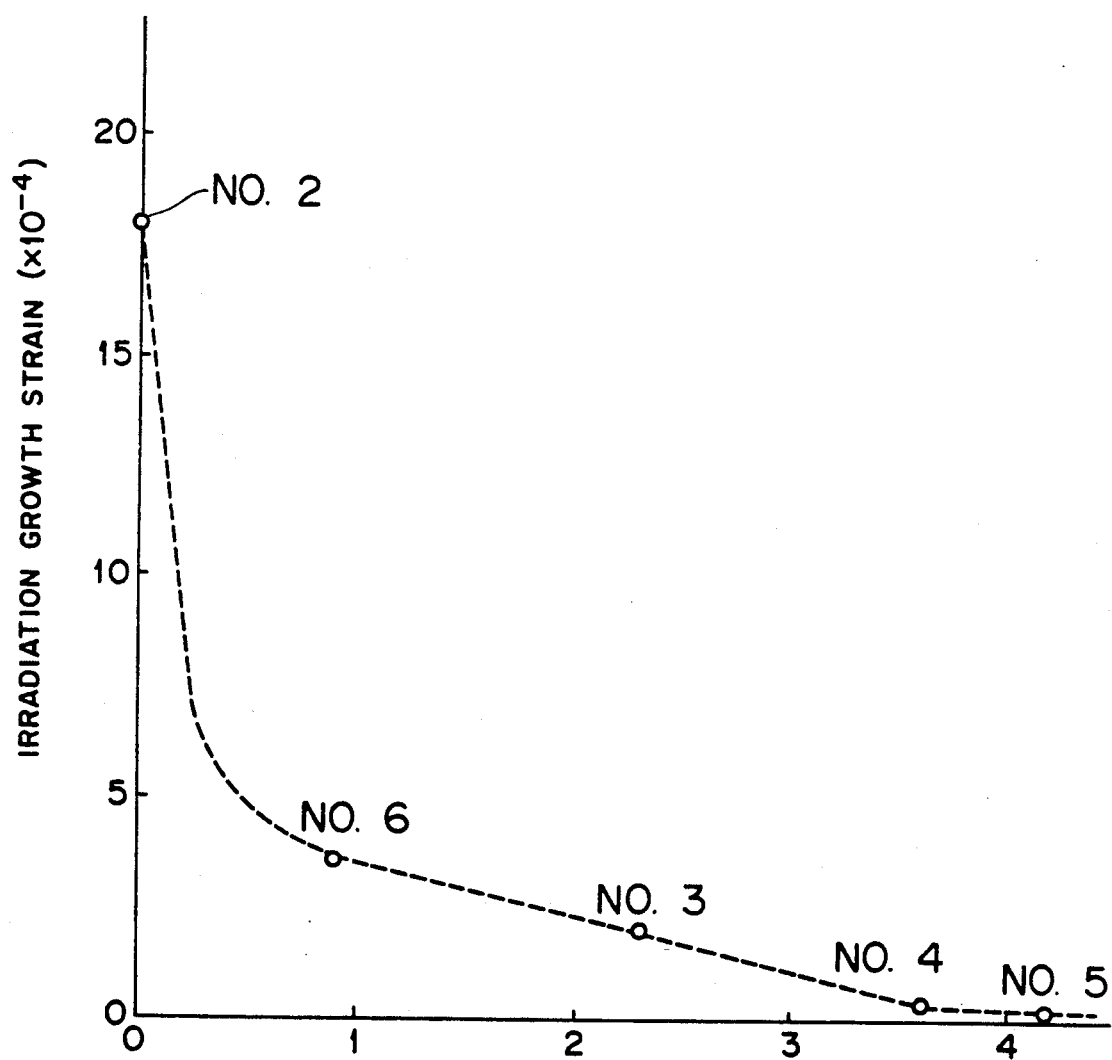
FIG. 7 is a diagram of a relationship between the irradiation growth strain and the parameter P.

FIG. 7 is a diagram showing the relationship between the parameter $P=(3.55+\log t) \times \log(T-980)$ and the irradiation growth strain. As shown in FIG. 7, the strain of irradiation growth is greatly influenced by the parameter P determined in accordance with the relationship between the temperature and the retention time of the heat treatment. The parameter P is an important factor of determination of the Zr<0001> crystal orientation rate. In the case of the heat treatment at 1,000° C., the strain of irradiation growth is abruptly reduced when P exceeds 0.5, is gradually further reduced as P is changed from 0.5 to 3.5, and is approximately constant and close to zero when P is 3.5 or greater. When P is smaller than 3.5, irradiation growth occurs. When P is 3.5 or greater, substantially no irradiation growth occurs.

The effect of limiting the irradiation growth strain is sufficiently high when P is 1.5 or greater. Preferably, P is set to 3.2 to 5.

Figure 8:
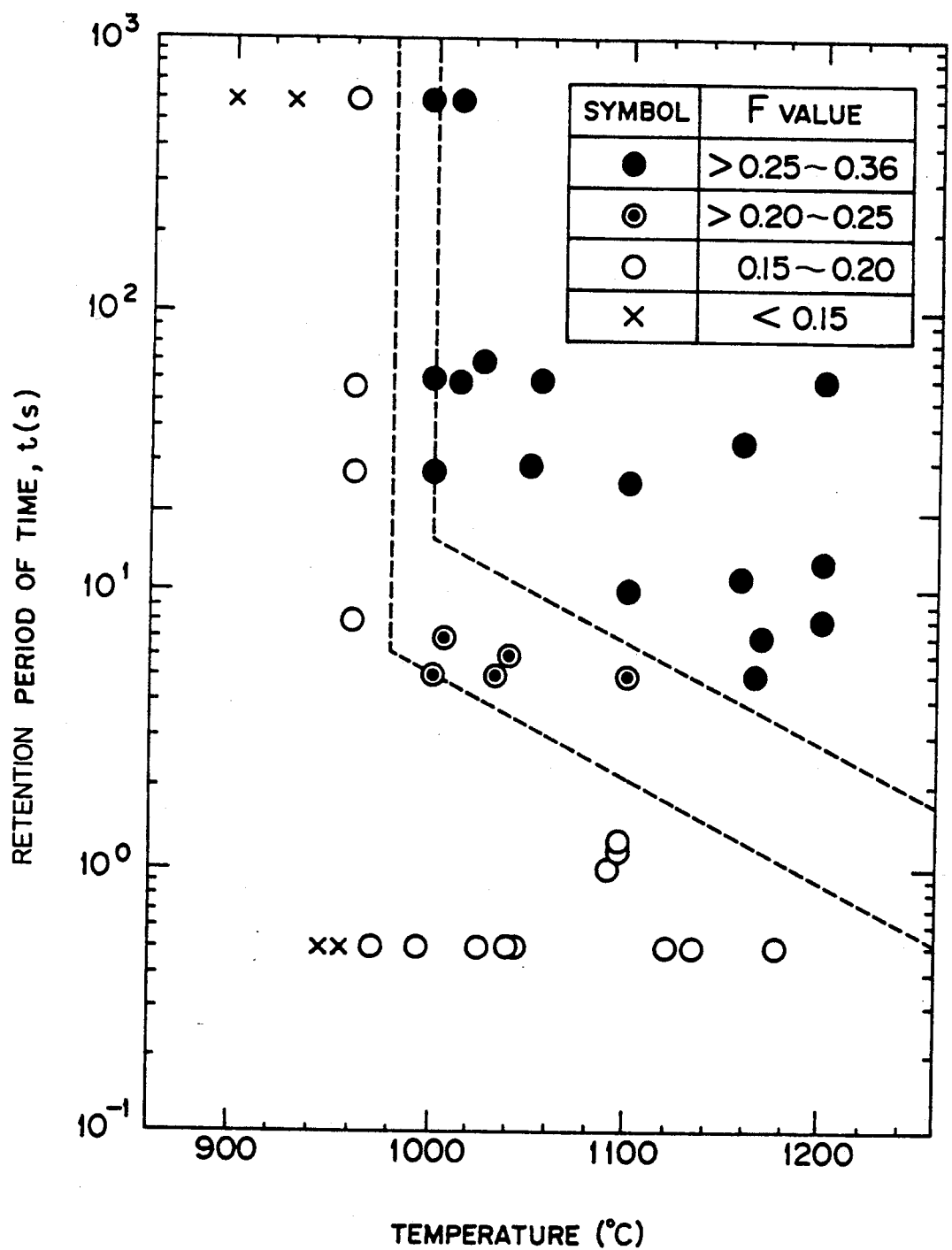
FIG. 8 is a diagram of a relationship between the temperature and the retention time with respect to the Fr value.

FIG. 8 is a diagram of the Fr values of alloys shown in Tables 1 and 4 with respect to the temperature and the retention time. As shown in FIG. 8, when the temperature is lower than 980° C., the Fr value is 0.20 or smaller and it is difficult to make <0002> crystal orientation random. However, by heating at 980° C. (1,000° C.) or higher for 11 sec. (10.5 sec.) or longer or at 1,240° C. or higher for 1.1 sec. or longer, i.e., heating under conditions as defined on or above a line connecting the points indicating these temperatures and times, the heat-treated member can have an Fr value exceeding 0.25 and a higher degree of randomness. By heating at 980° C. or higher for 6 sec. or longer or at 1,240° C. or higher for 6 sec. or longer, i.e., heating under conditions as defined on or above a line connecting them, the heat-treated member can have an Fr value greater than 0.20 and equal to or smaller than 0.25. In the case of heating under conditions defined below this line, the Fr value is equal to or smaller than 0.20, the degree of randomness is small, and the effect of limiting the elongation is small.

TABLE 4

| Alloy Name | Alloy Elements (wt %) | | | | | | Fe/Ni ratio |
|---|---|---|---|---|---|---|---|
| | Sn | Fe | Cr | Ni | O | Zr | |
| Zircaloy-2 | 1.50 | 0.15 | 0.10 | 0.05 | 0.11 | bal. | 3.0 |
| Zircaloy-A | 1.50 | 0.23 | 0.10 | 0.05 | 0.11 | bal. | 4.6 |
| Zircaloy-B | 1.50 | 0.23 | 0.10 | 0.09 | 0.11 | bal. | 2.6 |
| Zircaloy-C | 1.50 | 0.13 | 0.10 | 0.09 | 0.11 | bal. | 1.4 |
| Zircaloy-D | 1.50 | 1.10 | — | 0.08 | 0.11 | bal. | 1.3 |

EMBODIMENT 2

Figure 9:
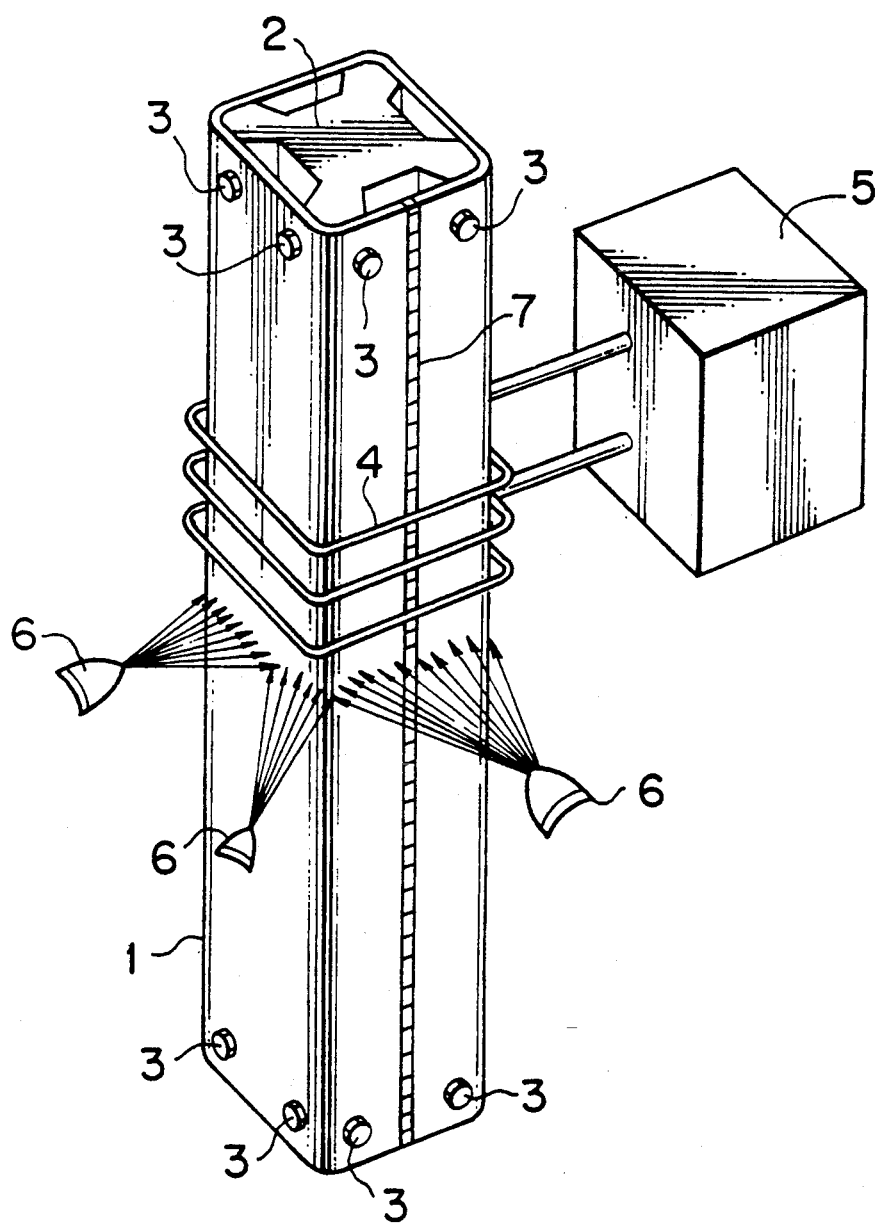
FIG. 9 is a perspective view of the construction of an apparatus for channel box manufacture method.

FIG. 9 shows an example of manufacture of a channel box in accordance with the present invention. Two members formed of Zircaloy C described with respect to Embodiment 1 were worked by cold bending into two channel-shaped members each having a length of 4 mm. These channel-shaped members were plasma-welded into the shape of a rectangular tube 1. Welded portions were finished flat so as to remove irregularities. A mandrel 2 formed of SUS304 (JIS) stainless steel was inserted in the rectangular tube 1 and was fixed to the same with screws 3. The rectangular tube 1 was thereafter heated to the $\beta$ phase temperature range by high-frequency induction heating using a high-frequency induction heating coil 4 and a high-frequency power source 5 and was quenched by cooling water strayed through nozzles 6 disposed immediately below the high-frequency induction heating coil 4. Hot water may be used as this cooling water. The mandrel 2 were formed so as to reduce the area of contact with the heated member in order to minimize the thermal influence upon the heated member. The rectangular tube 1 was passed through the coil at a constant speed vertically upwardly to be entirely heat-processed. The rectangular tube 1 feed speed and the output of the high-frequency power source 5 were controlled to set heating temperatures of 1,300° C. and 1,200° C. with a retention time of 20 sec. and a heating temperature of 1,100° C. with a retention time of 10 sec. After the heat treatment, test pieces having a width of 40 mm and a length of 40 mm were cut out and the F values thereof were measured by the X-ray diffraction method. Table 5 shows the results of this measurement. The parameter P is 3.26 in the case of heating at 1,300° C., 3.05 in the case of 1,200° C., or 2.07 in the case of 1,100° C.

TABLE 5

| (0002) plane | | | (1010) plane | | |
|---|---|---|---|---|---|
| Fr | Fl | Ft | Fr | Fl | Ft |
| 0.333 | 0.333 | 0.334 | 0.333 | 0.334 | 0.333 |

As can be understood from Table 5, each of the F value of (0002) and (1010) planes was reduced to ⅓ and the crystal orientation was made completely random.

These samples were tested by high-speed neutron irradiation. The strain caused by irradiation at $3 \times 10^{22}$ n/cm$^2$ was very small, about $0.3 \times 10^{-4}$ or less. The crystal grain sizes of these samples were 100, 150 and 250 μm, respectively.

After this heat treatment, there were effected sand blasting and acid cleaning to remove an oxidized layer of the tubular member from the surface thereof and thereafter an autoclave treatment using water vapor was effected.

Figure 10:
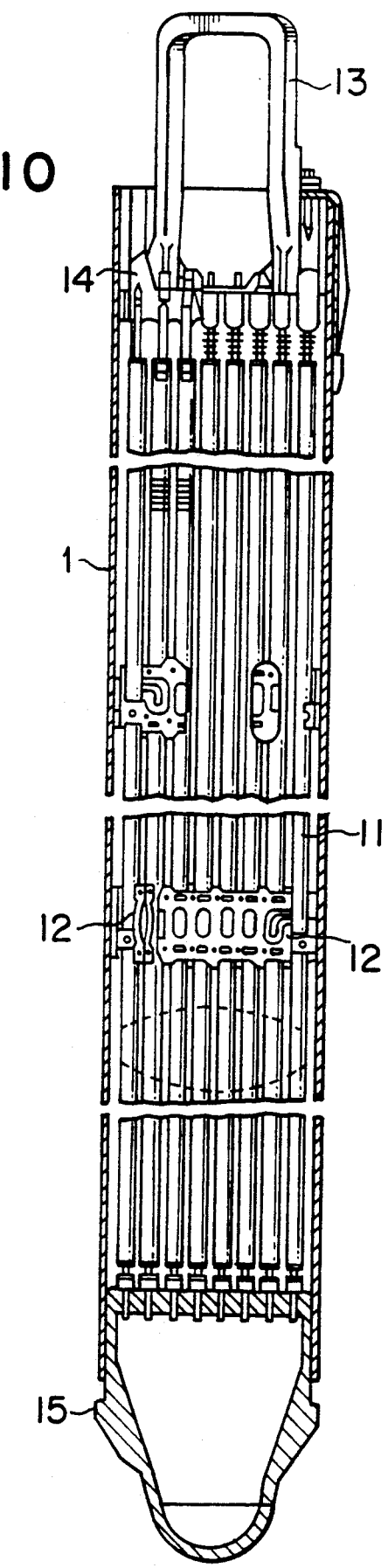
FIG. 10 is a cross-sectional view of a part of a fuel assembly.

FIG. 10 is a cross-sectional view of a part of a BWR fuel assembly using a tubular member manufactured in the above-described manner.

The BWR fuel assembly is constituted of, as illustrated, a multiplicity of fuel rods 11, spacers 12 for maintaining a predetermined spacing between the fuel rods 11, a tubular channel box 1 in which the rods 11 and the spacers 12 are accommodated, upper and lower tie plates 14 and 15 for supporting both ends of the fuel rods containing fuel pellets, and a handle 13 for carrying the whole assembly.

This fuel assembly is manufactured by a complicated manufacture process and the components are assembled by welding.

The fuel channel box 1 is used while containing the fuel rods 11 set with the fuel spacers and while having the fuel rods fixed by the upper and lower tie plates 14 and 15. The fuel channel box has the shape of a rectangular tube formed by plasma-welding two channel-shaped members as described above. This member serves to forcibly lead high-temperature water and water vapor generated at the fuel rods to an upper section during plant operation. It is used for a long period of time while always receiving such stress that the rectangular tube tends to expand outwardly.

The fuel assembly channel box is exposed to high-temperature high-pressure core water and subjected to neutron irradiation during use. Also, it receives an internal pressure because the pressure in the rectangular tube is higher than the external pressure. It is thereby necessary for the fuel assembly channel box to have corrosion resistance in a high-temperature and high-pressure environment and high creep deformation resistance under neutron irradiation.

Zirconium based alloys ordinarily have high corrosion resistance and a small neutron absorption sectional area. Because of these characteristics, they are suitable for a reactor fuel assembly material and are used to form fuel cladding tubes, channel box 1 and spacers 12 constituting the fuel assembly. Examples of available zirconium based alloys are Zircaloy-2 (1.2 to 1.7 wt % Sn, 0.07 to 0.2 wt % Fe, 0.05 to 0.15 wt % Cr, 0.03 to 0.08 wt % Ni and the balance Zr), Zircaloy-4 (1.2 to 1.7 wt % Sn, 0.18 to 0.24 wt % Fe, 0.05 to 0.15 wt % Cr and the balance Zr), Zr-0.5 to 2 wt % Nb alloy, Zr-2 to 5 wt % Sn-0.5 to 1.5 wt % Nb-0.5 to 1.5 wt % Mo alloy, Zr-0.5 to 1.5 wt % Sn-0.5 to 1.5 wt % Nb-0.1 to 1.0 wt % Fe alloy, and Zr-Nb (0.5 to 5.0 wt %)-Sn (0 to 3 wt %)-one or two or more of Fe, Ni, Cr, Ta, Pd, Mo and W (2 wt % or less) alloy. It has been confirmed that the present invention is effective when applied to any of plates made of these alloys.

These zircaloys are used for the cladding tube channel box and spacers in a boiling water reactor. However, local oxidation (nodular corrosion) is apt to occur, in particular, in cladding tubes. It is therefore preferable to effect hardening of only the outer surface thereof from the $\alpha+\beta$ phase or $\beta$ phase before final cold working but after final hot working. Preferably, the temperature of heating for hardening is 825 to 1,100° C., and the retention time at the temperature is within 1 minute, more preferably 3 to 30 seconds.

Preferably, heating is effected in continuous manner by use of an induction coil and cooling is effected by spraying water subsequently to the heating. Heating may be performed while causing water to flow in the tube. Preferably, for cladding tubes, the Fr value of <0001> orientation perpendicular to the tube surface is set to 0.66 or greater. For the hardening of the cladding tube, the temperature and the time are controlled so as to prevent the crystal orientation from being made random. Zirconium-niobium alloy containing Nb has a large strength, improved creep characteristics, a low hydrogen absorption rate and is free from local corrosion called nodular corrosion. These characteristics are suitable for a fuel assembly member material. However, they are disadvantageous in that corrosion of welded portions and thermally influenced portions is accelerated so that a separable, thick white oxide is easily formed.

A zirconium alloy containing 0.5 to 2.0 wt % Nb, 1.5 wt % or less of Sn and 0.25 wt % or less of a third alloy element selected from the group consisting of Fe, Cr, Mo, V, Cu, Ni and W, formed as a niobium-zirconium multi-element alloy, has a special microstructure having corrosion resistance in a high-temperature vapor environment.

The channel box in accordance with the present invention, formed of these alloys, is obtained by heating for a suitable time and by quenching so that each of the F values of (0002) and 1010) planes is reduced to $\frac{1}{3}$. The channel box thereby formed can be used at a degree of burn- up of 45 Gwd/t as well as at 32 Gwd/t, and can also used in a 2-cycle manner such that a clad attached to the surface is removed and the fuel is changed to reuse the box. Because the amount of deformation is minimized, it can be used in the same position in the core as the previous use. It is also preferable to effect the same heat treatment and orientation provision for cladding tubes formed of the above-mentioned alloys other than the zircaloy as those effected in the zircaloys.

According to the present invention, as described above, the crystal orientation of a fuel assembly zirconium member can be made random, so that no serious bending deformation due to irradiation growth occurs even during use in a high irradiation environment in which the amount of neutron irradiation exceeds $10^{22}$ (n/cm$^2$). The fuel assembly zirconium member can therefore be used for a long time, which effect contributes to the reduction in the spent fuel waste. The fuel assembly zirconium member is also improved in corrosion resistance and, hence, in reliability.

What is claimed is:

1. A zirconium based alloy plate of low irradiation growth, containing at least one of 0.1-5 wt % Sn and 0.1-5 wt % Nb, and the balance Zr of not less than 90 wt %, said alloy plate having a texture that <0001> orientation (Fr value) with respect to direction perpendicular to the surface of the plate ranges from 0.25 to 0.36.

2. A square tubular member made of a zirconium based alloy plate of low irradiation growth, containing at least one of 0.1-5 wt % Sn and 0.1-5 wt % Nb, and the balance Zr of not less than 90 wt %, said alloy having a texture that <0001> orientation (Fr value) with respect to direction perpendicular to the surface of the tubular member ranges from 0.25 to 0.36, which another orientation (Ft value) with respect to longitudinal direction of the tubular member ranges from 0.25 to 0.36, which another orientation (Fl value) with respect to circumferential direction of the tubular member ranges from 0.25 to 0.36.

3. A zirconium based alloy plate of low irradiation growth, containing at least one 0.1-5 wt % Sn and 0.1-5 wt % Nb, and the balance Zr of not less than 90 wt %, said alloy having $\alpha$ phase, and the grain size of the alloy being in the range of 50 to 500 $\mu$m.

4. A zirconium based alloy plate of low irradiation growth, containing at least one of 0.1-5 wt % Sn and 0.1-5 wt % Nb, and the balance of Zr of not less than 90 wt %, said alloy having $\alpha$ phase, said alloy plate having <0001> crystal grain orientation of hexagonal Zr which <0001> orientation is oriented substantially random, and strain occurring due to fast neutron irradiation growth being not more than $3\times10^{-4}$.

5. A zirconium based alloy plate of low irradiation growth, containing at least one of 0.1-5 wt % Sn and 0.1-5 wt % Nb, and the balance Zr of not less than 90 wt %, said alloy having $\alpha$ phase, said alloy having a texture that <0001> orientation (Fr value) with respect to direction perpendicular to the surface of the plate ranges from 0.25 to 0.36.

6. In a method of producing a zirconium based alloy plate of low irradiation growth which contains at least one of 0.1-5 wt % Sn and 0.1-5 wt % Nb and the balance Zr of not less than 90 wt %, comprising the steps of: heating the alloy into a $\beta$ single phase temperature range; and cooling the alloy, the improvement comprising the steps of retaining the alloy in the $\beta$ single phase temperature range in a short period of time so that <0001> orientation (Fr value) with respect to direction perpendicular to the surface of the plate ranges from 0.25 to 0.36, and quenching the alloy.

7. In a method of producing a zirconium based alloy plate of low irradiation growth which contains at least one of 0.1-5 wt % Sn and 0.1-5 wt % Nb and the balance Zr of not less than 90 wt %, comprising the steps of: heating and keeping the alloy plate in a $\beta$ single phase temperature range; and cooling the alloy plate, the improvement comprising the steps of retaining in a short period of time the alloy plate in the $\beta$ single phase temperature range so that value of parameter P defined by $P=(3.55+\log t)\times\log(T-980)$, where t (h) is a retaining period of time and T is a maximum temperature (° C.), is not less than 0,8; and quenching the alloy.

8. In a method of producing a square tubular member made of a low irradiation growth zirconium based alloy containing at least one of 0.1-5 wt % Sn and 0.1-5 wt % Nb and the balance Zr of not less than 90 wt %, comprising the steps of: locally induction-heating and keeping in a short period of time the tubular member in a $\beta$ single phase temperature range; and forcibly cooling the heated portion of the tubular member by cooling medium, the improvement comprising the steps of retaining the tubular member portion in a short period of time in the β single phase temperature range so that <0001> orientation (Fr value) with respect to direction perpendicular to the surface of the tubular member ranges from 0.25 to 0.36, and quenching the heated portion.

9. In a method of producing a square tubular member made of a zirconium based alloy according to claim 6, comprising the steps of continuously induction-heating a portion of the tubular member locally while moving it relatively, and forcibly cooling the heated portion by a cooling medium, the improvement comprising the steps of inserting in the tubular member a mandrel made of a metal material having a thermal expansion coefficient large than that of the alloy, and heating the tubular member from the outer surface of the tubular member while fixing at least both ends of the tubular member by the mandrel.

10. A fuel channel box formed of a square tubular member formed by welding two channel-shaped members made of zirconium based alloy, said alloy having a texture that <0001> orientation (Fr value) with respect to direction perpendicular to the surface of the tubular member ranges from 0.25 to 0.36, the whole surface of said channel box being provided with oxide layer formed by autoclave treatment.

11. A fuel assembly comprising a fuel rod provided within a fuel cladding tube with fuel pellets, a channel box receiving a plurality of the fuel rods, a spacer for partitioning the fuel rods received in the channel box, and upper and lower tie plates disposed respectively at the upper and lower portions of the channel box, said channel box being made of a zirconium based alloy containing at least one of 0.1-5 wt % Sn and 0.1-5 wt % Nb and the balance Zr of not less than 90 wt %, said alloy having a texture that <0001> orientation (Fr value) with respect to direction perpendicular to the surface of a plate ranges from 0.25 to 0.36.

12. A method of using a nuclear fuel channel box made of a zirconium based alloy in which channel box a plurality of nuclear fuel rods are disposed, said alloy having a texture that <0001> orientation (Fr value) with respect to direction perpendicular to the surface of a tubular member ranges from 0.25 to 0.36, said nuclear fuel being exchanged during the use of the channel box at least once.

13. A method of using a nuclear fuel channel box in a reactor core of a nuclear reactor, the nuclear fuel channel box being formed of a tubular member formed by welding two channel-shaped members made of a zirconium based alloy, said alloy having a texture that <0001> orientation (Fr value) with respect to direction perpendicular to the surface of the tubular member ranges from 0.25 to 0.36, the whole surface of said channel box being provided with oxide film formed by autoclave treatment, said channel box being used so that the degree of burn-up of a nuclear fuel while in the reactor core is not less than 32 Gwd/t, and so that nuclear fuel is exchanged at least once during the use of the channel box.

14. A method of using a fuel assembly in a reactor core of a nuclear reactor, the fuel assembly having a fuel rod provided within a fuel cladding tube with fuel pellets, a channel box receiving a plurality of the fuel rods, a spacer for partitioning the fuel rods received in the channel box, and upper and lower lattice plates disposed respectively at the upper and lower portions of the channel box, said channel box being made of a zirconium based alloy containing at least one of 0.1-5 wt % Sn and 0.1-5 wt % Nb and the balance Zr of not less than 90 wt %, said alloy having a texture that <0001> orientation (Fr value) with respect to direction perpendicular to the surface of a plate ranges from 0.25 to 0.36, the channel box being used so that the degree of burn-up of nuclear fuel while in the reactor core is not less than 32 Gwd/t, and so that nuclear fuel is exchanged at least once during the use of the channel box.

15. A method of using a nuclear fuel channel box in a reactor core of a nuclear reactor, the nuclear fuel channel box being made of a zirconium based alloy in which channel box a plurality of nuclear fuel rods are disposed, said alloy comprising hexagonal crystals having a texture that <0001> orientation (Fr value) with respect to direction perpendicular to the surface of the tubular member ranges from 0.25 to 0.36, said channel box being used so that the degree of burn-up of nuclear fuel while in the reactor core is not less than 32 Gwd/t, and so that it is exposed to neutron irradiation of not less than $10^{22}$n/cm during the use of the channel box.

16. A method of operating a nuclear reactor having within a reactor core a plurality of nuclear fuel channel boxes each formed of a tubular box made of a zirconium based alloy, comprising the steps of exchanging fuel after a predetermined period of operation time, and subsequently operating the reactor in a predetermined period of time, said alloy containing hexagonal crystals having a texture that <0001> orientation (Fr value) with respect to direction perpendicular to the surface of the tubular box ranges from 0.25 to 0.36, said channel boxes being subjected to such operation as the degree of burn-up of fuel while in the reactor core is about 32 Gwd/t or more, and then fuel is exchanged at least once during the use of the channel boxes, respective channel boxes being disposed in a same operation position before and after the exchange of the fuel.

17. A zirconium based alloy plate according to claim 3, wherein the alloy plate has a texture that <0001> orientation (Fr value) with respect to direction perpendicular to the surface of the plate ranges from 0.25 to 0.36.

18. A zirconium based alloy plate according to claim 4, wherein the alloy plate has a texture that <0001> orientation (Fr value) with respect to direction perpendicular to the surface of the plate ranges from 0.25 to 0.36.

19. A method of producing a zirconium based alloy plate according to claim 7, wherein the short period of time that the alloy plate is retained in the β single phase temperature range is a period such that <0001> orientation (Fr value) with respect to direction perpendicular to the surface of the plate ranges from 0.25 to 0.36.

20. A method of producing a square tubular member according to claim 9, wherein the tubular member is heated such that the member has a texture that <0001> orientation (Fr value) with respect to direction perpendicular to the surface of the member ranges from 0.25 to 0.36.

21. A zirconium based alloy plate according to claim 1, wherein Fr ranges from 0.31 to 0.35.

22. A zirconium based alloy plate according to claim 1, wherein the alloy plate has another orientation (Ft value), with respect to a longitudinal direction of the plate, which ranges from 0.25 to 0.36; and has another orientation (Fl value), with respect to a widthwise direction of the plate, which ranges from 0.25 to 0.36.

23. A zirconium based alloy plate according to claim 22, wherein each of Fr, Ft and Fl range from 0.31 to 0.35.

24. A method of producing a zirconium based alloy plate according to claim 7, wherein P is 2.5 to 5.

25. A method of producing a zirconium based alloy plate according to claim 6, wherein the alloy is quenched at a cooling speed not lower than 50° C./sec.

26. A method of producing a square tubular member according to claim 9, wherein said mandrel is made of an austenitic stainless steel.

27. A fuel channel box comprising a square tubular member formed by welding two channel-shaped parts made of zirconium based alloy, said alloy having a texture that <0001> orientation (Fr value) with respect to direction perpendicular to the surface of the tubular member ranges from 0.20 to 0.50, so as to avoid irradiation growth of the fuel channel box.

28. In a method of producing a zirconium based alloy plate, a low irradiation growth according to claim 6, of a zirconium based alloy, comprising the steps of heating the alloy into a $\beta$ single phase temperature range and cooling the alloy, the improvement comprising wherein $\beta$ zirconium crystal grains are grown during the heating to a grain size of at least 50 $\mu$m, and cooling is performed by quenching.

29. A method of producing a zirconium based alloy plate according to claim 28, wherein the $\beta$ zirconium crystal grains are grown to a grain size of at least 100 $\mu$m.

30. A method of producing a zirconium based alloy plate according to claim 29, wherein the $\beta$ zirconium crystal grains are grown to a grain size of at least 150 $\mu$m.

* * * * *